US009135566B2

United States Patent
Yu et al.

(10) Patent No.: US 9,135,566 B2
(45) Date of Patent: Sep. 15, 2015

(54) APPARATUS AND METHOD FOR PROCESSING SENSOR DATA IN SENSOR NETWORK USING A FEATURE VECTOR IDENTIFIER OF THE SENSOR DATA

(75) Inventors: Hong Yeon Yu, Gwang-ju (KR); Sim-Kwon Yoon, Gwang-ju (KR); Nac Woo Kim, Gwang-ju (KR); Byung-Tak Lee, Suwon-si (KR); Young Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 13/598,663

(22) Filed: Aug. 30, 2012

(65) Prior Publication Data

US 2013/0218816 A1    Aug. 22, 2013

(30) Foreign Application Priority Data

Feb. 20, 2012    (KR) .................. 10-2012-0017075

(51) Int. Cl.
*G06F 15/18*    (2006.01)
*G06N 99/00*    (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS 8,055,763    B2    11/2011    Yoo et al.
2001/0025283    A1 *    9/2001    Sim et al. ................... 707/104.1

2007/0136740    A1    6/2007    Lee et al.
2011/0216948    A1 *    9/2011    Yalla et al. ..................... 382/125
2012/0128241    A1 *    5/2012    Jung ............................. 382/165
2012/0236855    A1 *    9/2012    Kim et al. ..................... 370/390

FOREIGN PATENT DOCUMENTS

| KR | 10-0749820 B1 | 8/2007 |
| KR | 10-0771236 | 10/2007 |
| KR | 1020090036222 | 4/2009 |
| KR | 1020090082536 | 7/2009 |

OTHER PUBLICATIONS

Osadchy et al. "SCiFI—A system for Secure Face Identification" IEEE Symposium on Security and Privacy, 2010, pp. 16.*

(Continued)

*Primary Examiner* — Li-Wu Chang
(74) *Attorney, Agent, or Firm* — Nelson Mullins Riley & Scarborough LLP

(57) ABSTRACT

In a sensor network, a sensor data processing apparatus generates a feature vector identifier table by classifying feature vector identifiers of a plurality of situation information determination reference data to be a reference of situation determination according to a sensor type index and a feature vector identifier set index of the plurality of situation information reference data. When the sensor data processing apparatus receives sensor data, the sensor data processing apparatus generates a feature vector identifier of the sensor data and extracts a sensor type index and a feature vector identifier set index of a feature vector identifier most similar to the feature vector identifier of sensor data with reference to a feature vector identifier table, and generates situation recognition information using the extracted sensor type index and feature vector identifier set index.

13 Claims, 9 Drawing Sheets

(56) References Cited

OTHER PUBLICATIONS

IEEE, "Part 11: Wireless LAN Medium Access Control (MAC) and Physical Layer (PHY) specifications," Draft Standard for Information Technology—Telecommunications and information exchange between systems—Local and metropolitan area networks—Specific requirements, IEEE P802.11s D12.0, 383 pages, (2011).

* cited by examiner

FIG. 5

| Sensor type index | Feature vector identifier set index | Feature vector identifier |
|---|---|---|
| 1 | 1 | 001100111011<br>001100100001<br>001100011111<br>110000100000 |
| | 2 | 001111111011<br>001100100001<br>000000011111<br>110000100000 |
| | 3 | 001100111011<br>001100111111<br>010100011111<br>110000100000 |
| 2 | 1 | 001100111000<br>001100111100<br>110110100011<br>110000100000 |
| | 2 | 001100111000<br>001100111100<br>110110100011<br>110000111111 |
| ... | ... | ... |

FIG. 6

| Sensor type index | Feature vector identifier |
|---|---|
| 1 | 001100111011<br>001100100001<br>001100011111<br>110000100000 |
| 2 | 001100111000<br>001100111100<br>110110100011<br>110000111111 |
| ... | ... |

APPARATUS AND METHOD FOR PROCESSING SENSOR DATA IN SENSOR NETWORK USING A FEATURE VECTOR IDENTIFIER OF THE SENSOR DATA

CROSS-REFERENCE TO RELATED APPLICATION

This application claims priority to and the benefit of Korean Patent Application No. 10-2012-0017075 filed in the Korean Intellectual Property Office on Feb. 20, 2012, the entire contents of which are incorporated herein by reference.

BACKGROUND OF THE INVENTION (a) Field of the Invention

The present invention relates to a method and apparatus for processing sensor data in a sensor network. More particularly, the present invention relates to a method and apparatus for processing sensor data that can distinguish and classify feature information of sensor data that is acquired from different kinds of sensors in a sensor network.

(b) Description of the Related Art

In a sensor network-based integration control system such as a ubiquitous sensor network (USN), a wireless sensor network (WSN), and a machine-to-machine network (M2M), in order to provide situation recognition information, sensor data processing technology that can distinguish and classify data that are sensed by a sensor to correspond to a specific situation is very important. Sensor data processing technology for such situation recognition generally uses pattern recognition technology, which is a machine learning technique that teaches a set of sensed data to a machine and that enables the machine to distinguish or classify situation information about newly sensed data.

A sensor data processing process generally using pattern recognition technology includes a pretreatment step of extracting a feature vector by removing noise and analyzing a characteristic pattern in order to well represent a characteristic of sensor data, a step of selecting and modeling an importance feature vector from feature vectors that are formed in multi-dimensions using a dimension reduction technique such as principle component analysis or linear component analysis, and a step of determining situation recognition information by applying a clustering algorithm or classifier algorithm of a feature vector model of newly collected sensor data using supervise learning and unsupervised learning techniques from a modeled feature vector set.

A service providing situation recognition information through such machine learning can provide good situation recognition performance as a dimension of a feature vector is high, but there is a problem that a system memory request amount and a calculation amount of a high dimensional feature vector increase. Particularly, when situation recognition information is provided through cooperation of various sensors, there is a problem that a dimension reduction process of a dynamic feature vector of a large quantity of sensor data should be performed. Further, because extracted feature vectors are classified using machine learning, classification models according to a feature vector group are requested according to a classification purpose, and system complexity thus increases and therefore it is difficult to secure real-time processing.

SUMMARY OF THE INVENTION

The present invention has been made in an effort to provide a method and apparatus for processing sensor data in a sensor network that can solve a problem of a calculation amount of a high dimensional feature vector, a system memory request amount, and a complexity degree increase that may occur when processing sensor data in a service of providing situation recognition information through machine learning.

An exemplary embodiment of the present invention provides a method of processing sensor data in a sensor data processing apparatus of a sensor network. The method includes: generating a feature vector identifier table in which feature vector identifiers of a plurality of situation information determination reference data to be a reference of situation determination are stored; generating a feature vector identifier of sensor data that is received from a sensor; and generating situation recognition information of the sensor data using situation information determination reference data having a feature vector identifier most similar to the feature vector identifier of the sensor data with reference to the feature vector identifier table.

The feature vector identifier may be formed with a bit series of a fixed length of an N×M form.

The generating of a feature vector identifier may include: extracting a feature vector of the sensor data; and expressing the feature vector of the sensor data with a bit series of an N×M form.

The expressing of a feature vector may include converting the feature vector of the sensor data to the bit series through time series analysis or frequency analysis.

The generating of a feature vector identifier table may include: extracting each of feature vectors of the plurality of situation information determination reference data; generating a feature vector identifier of the plurality of situation information determination reference data by expressing each of feature vectors of the plurality of situation information determination reference data with bit series; and generating the feature vector identifier table by classifying each of the feature vector identifiers of the plurality of situation information determination reference data according to a sensor type index and a feature vector identifier set index of the plurality of situation information determination reference data. The sensor type index is determined according to a sensor type, and the feature vector identifier set index is determined by a user according to situation information in the same sensor type index.

The generating of a feature vector identifier of a sensor data may include" extracting a feature vector of the sensor data; generating a feature vector identifier of the sensor data by expressing the feature vector of the sensor data with a bit series; and storing the feature vector identifier of the sensor data to correspond to a sensor type index of the sensor data.

The generating of situation recognition information may include: extracting the feature vector identifier set index and a sensor type index of a feature vector identifier of situation information determination reference data most similar to the feature vector identifier of the sensor data with reference to the feature vector identifier table; and generating the situation recognition information using the extracted sensor type index and feature vector identifier set index.

Another embodiment of the present invention provides an apparatus that processes sensor data in a sensor network. The apparatus includes a sensor data processing controller, a reference data processing controller, a matching unit, and a situation recognition unit. The sensor data processing controller generates a feature vector identifier of a bit series from sensor data of a sensor. The reference data processing controller generates a feature vector identifier of a bit series from a plurality of situation information determination reference data to be a reference of situation determination, and generates a feature vector identifier table using the feature vector identifier of the plurality of situation information determination reference data. The matching unit compares the feature vector identifier of the feature vector identifier table and the feature vector identifier of the sensor data. The situation recognition unit generates situation recognition information of the sensor data using a feature vector identifier of situation information determination reference data most similar to the feature vector identifier of the sensor data.

The sensor data processing controller may analyze a feature vector from the sensor data and convert the feature vector of the sensor data to a bit series of an N×M form, and the reference data processing controller may analyze feature vectors from each of the plurality of situation information determination reference data and convert feature vectors of each of the plurality of situation information determination reference data to a bit series of an N×M form.

The reference data processing controller may generate the feature vector identifier table by classifying each of feature vector identifiers of the plurality of N×M form reference data according to a sensor type index and a feature vector identifier set index.

The matching unit may extract a sensor type index and a feature vector identifier set index corresponding to a feature vector identifier of situation information determination reference data most similar to the feature vector identifier of the sensor data with reference the feature vector identifier table, and the situation recognition unit may generate the situation recognition information using the extracted sensor type index and feature vector identifier set index.

BRIEF DESCRIPTION OF THE DRAWINGS

FIG. 5 is a diagram illustrating an example of a table storage unit that is shown in FIG. 3.

FIG. 6 is a diagram illustrating an example of a storage unit that is shown in FIG. 4.

DETAILED DESCRIPTION OF THE EMBODIMENTS

Figure 1:
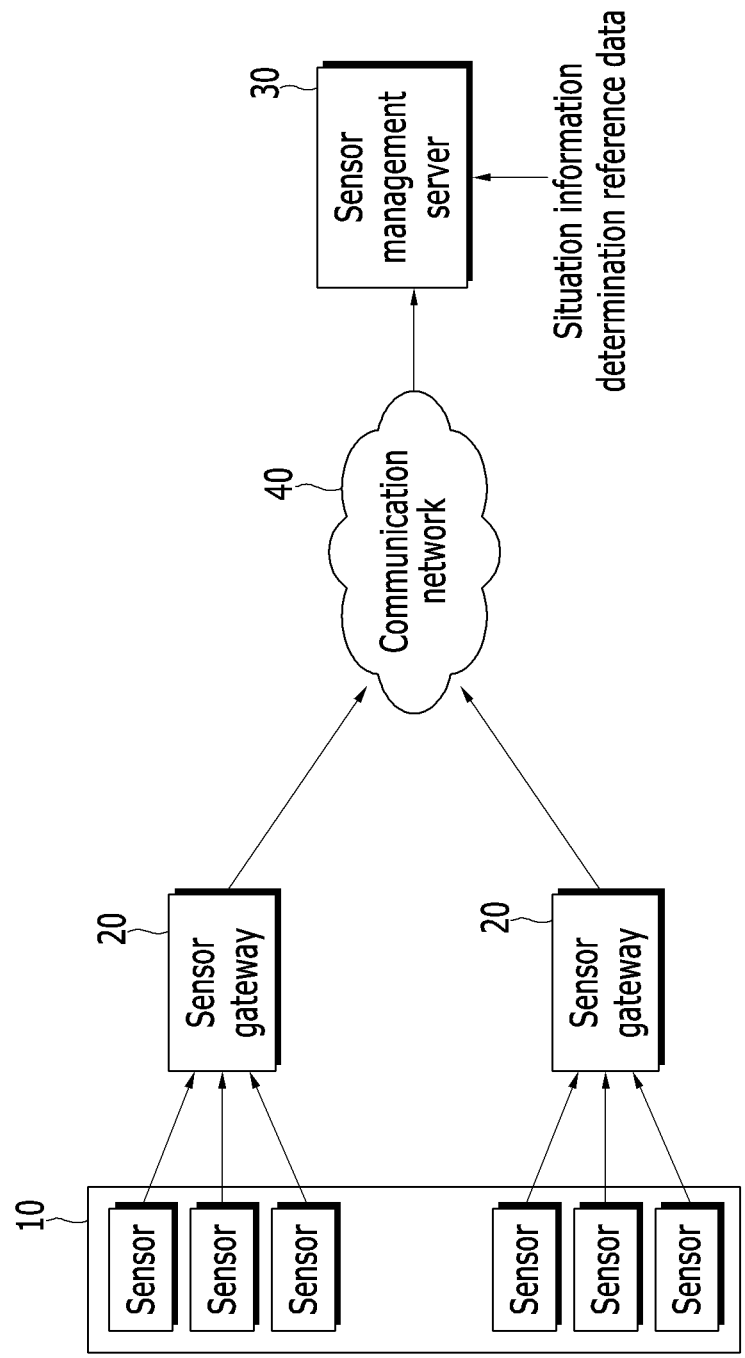
FIG. 1 is a diagram illustrating a sensor network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for processing sensor data in a sensor network according to an exemplary embodiment of the present invention will be described in detail with reference to the drawings.

FIG. 1 is a diagram illustrating a sensor network system according to an exemplary embodiment of the present invention.

Referring to FIG. 1, the sensor network system includes a sensor 10, a sensor gateway 20, and a sensor management server 30.

The sensor 10 detects physical data such as light, sound, temperature, and motion in a physical space, and transfers the detected data to the sensor gateway 20. Hereinafter, data that is detected by the sensor 10 is referred to as sensor data.

The sensor network system collects necessary data using various kinds of sensors 10, and the sensor data may include recognition information of an object and peripheral environment information (temperature, humidity, illumination, contamination information, crack information, etc.) according to a kind of the sensor 10.

The sensor gateway 20 acquires sensor data from the sensor 10, processes the acquired sensor data, and transmits the processed sensor data to the sensor management server 30 through a communication network 40.

The sensor management server 30 manages the sensor gateway 20 and processes a plurality of reference data to be a reference for situation determination.

Figure 2:
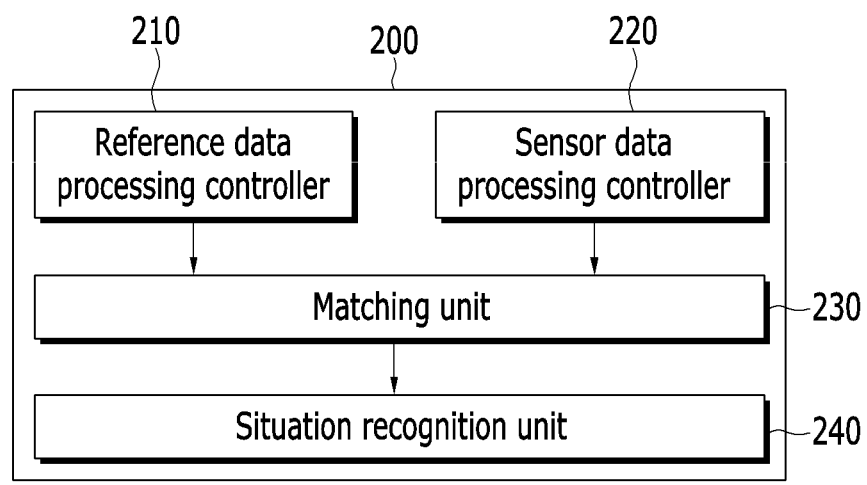
FIG. 2 is a block diagram illustrating a configuration of a sensor data processing apparatus of a sensor network system according to an exemplary embodiment of the present invention.
Figure 3:
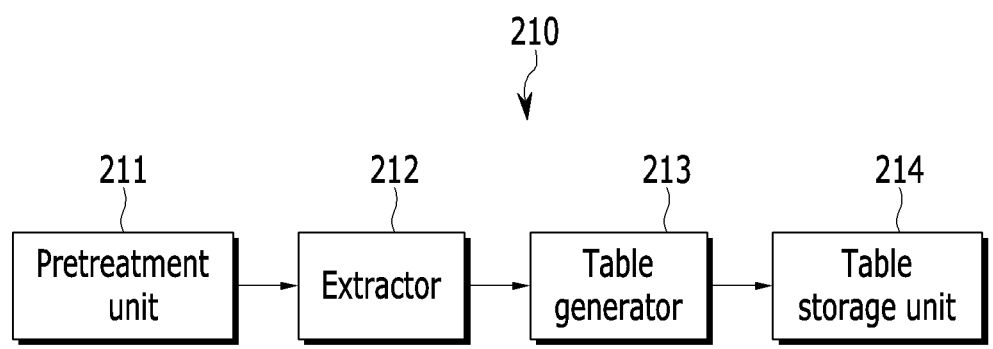
FIG. 3 is a block diagram illustrating a configuration of a reference data processing controller that is shown in FIG. 2.
Figure 4:
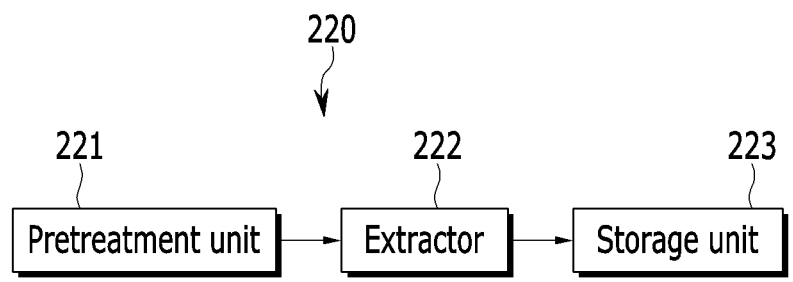
FIG. 4 is a block diagram illustrating a configuration of a sensor data processing controller that is shown in FIG. 2.

FIG. 2 is a block diagram illustrating a configuration of a sensor data processing apparatus of a sensor network system according to an exemplary embodiment of the present invention, FIG. 3 is a block diagram illustrating a configuration of a reference data processing controller that is shown in FIG. 2, and FIG. 4 is a block diagram illustrating a configuration of a sensor data processing controller that is shown in FIG. 2.

Referring to FIG. 2, a sensor data processing apparatus 200 includes a reference data processing controller 210, a sensor data processing controller 220, a matching unit 230, and a situation recognition unit 240.

In order to determine situation recognition information, the reference data processing controller 210 previously analyzes sensor data and generates a feature vector identifier from defined data. Hereinafter, data that is defined by previously analyzing sensor data in order to determine situation recognition information is referred to as situation information determination reference data. The sensor data processing controller 220 generates a feature vector identifier from data that are sensed from a plurality of sensors 10.

Referring to FIG. 3, the reference data processing controller 210 includes a pretreatment unit 211, an extractor 212, a table generator 213, and a table storage unit 214.

The pretreatment unit 211 performs pretreatment that removes noise of situation information determination reference data. The pretreatment unit 211 removes noise from reference data through a signal processing technique such as a band-limited filter, a high-limited filter, and a low pass filter.

The extractor 212 analyzes a characteristic pattern of pretreated situation information determination reference data, and summarizes feature vectors that can abstract a characteristic pattern with a fixed bit series having a fixed length of two dimensions, thereby generating a feature vector identifier of reference data. That is, a fixed bit series of an N×M form may become a feature vector identifier of situation information determination reference data that is defined by a user. The extractor 212 expresses a feature vector of reference data with a fixed bit series through time series analysis or frequency analysis.

The table generator 213 classifies feature vector identifiers of situation information determination reference data into a feature vector identifier set index group according to situation information that is defined by the user and groups a feature vector identifier set index into a sensor type index, thereby generating a feature vector identifier table.

That is, the feature vector identifier is stored to a feature vector identifier table together with the sensor type index and a feature vector identifier set index. The sensor type index is determined according to a sensor type of reference data, and the feature vector identifier set index is determined by the user according to situation information of the same type.

The table storage unit 214 stores a feature vector identifier table.

Further, referring to FIG. 4, the sensor data processing controller 220 includes a pretreatment unit 221, an extractor 222, and a storage unit 223.

The pretreatment unit 221 removes noise from sensor data that is presently collected from the sensor 10 through pretreatment. The pretreatment unit 221 removes noise from sensor data through a signal processing technique such as a band-limited filter, a high-limited filter, and a low pass filter.

The extractor 222 summarizes a feature vector that analyzes a characteristic pattern of pretreated sensor data and that abstracts a characteristic pattern with a fixed bit series of an N×M form having a fixed length of two dimensions, thereby generating a feature vector identifier of sensor data that is acquired in real time. The extractor 222 expresses a feature vector of sensor data with a fixed bit series through time series analysis or frequency analysis.

The extractor 222 stores a feature vector identifier of sensor data at the storage unit 223 to correspond to a sensor type index of the sensor data.

The storage unit 223 stores a feature vector identifier of sensor data.

Referring again to FIG. 2, the matching unit 230 performs a similarity comparison between a feature vector identifier of sensor data that is generated in FIG. 4 and feature vector identifiers corresponding to a sensor type index in a feature vector identifier table that is generated in FIG. 3.

The matching unit 230 extracts a feature vector identifier set index and a sensor type index of a feature vector identifier most similar to or corresponding with a feature vector identifier of sensor data among feature vector identifiers of situation information determination reference data corresponding to a sensor type index of sensor data. In this case, a method of determining similarity uses a general matching algorithm such as a bit-error rate (BER).

That is, the matching unit 230 extracts a feature vector identifier set index and a sensor type index from a feature vector identifier table that is defined with various situation information that may be generated in one sensor through similarity comparison with a feature vector identifier of presently collected sensor data.

The matching unit 230 transfers the extracted feature vector identifier set index and sensor type index to the situation recognition unit 240.

The situation recognition unit 240 generates situation recognition information that is defined by the user using a sensor type index of sensor data and a feature vector identifier set index that is extracted from the matching unit 230, and provides the generated situation recognition information to an integration controls center (not shown).

In the sensor data processing apparatus 200, the reference data processing controller 210 and the situation recognition unit 240 may be formed in the sensor management server 30, and the sensor data processing controller 220 may be formed in the sensor gateway 20. The matching unit 230 may be formed in the sensor management server 30 or in the sensor gateway 20.

FIG. 5 is a diagram illustrating an example of a table storage unit that is shown in FIG. 3.

Referring to FIG. 5, a feature vector identifier is stored at a feature vector identifier table together with a predefined sensor type index and feature vector identifier set index.

FIG. 6 is a diagram illustrating an example of a storage unit that is shown in FIG. 4.

Referring to FIG. 6, a feature vector identifier that is extracted from sensor data is stored together with a sensor type index that is formed equally to the reference data processing controller 210 that is shown in FIG. 3.

Figure 7:
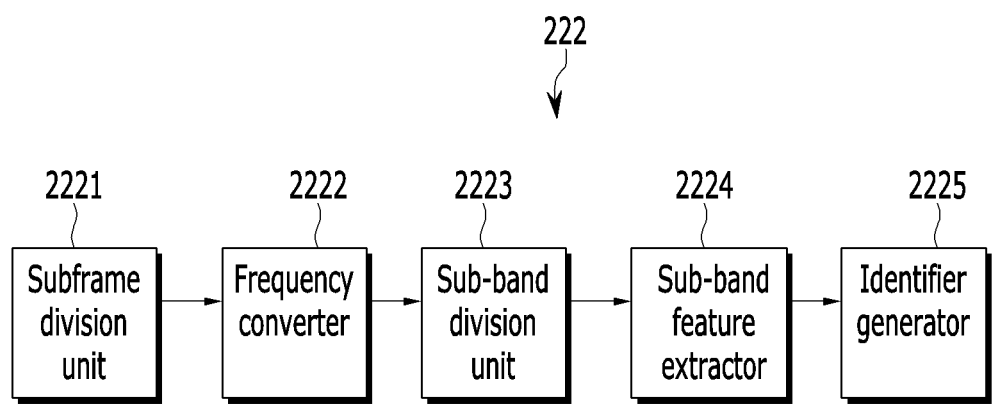
FIG. 7 is a block diagram illustrating a configuration of an extractor that is shown in FIGS. 3 and 4 according to an exemplary embodiment of the present invention.

FIG. 7 is a block diagram illustrating a configuration of an extractor that is shown in FIGS. 3 and 4 according to an exemplary embodiment of the present invention.

FIG. 7 illustrates the extractor 222, but the extractor 212 may be formed similarly to the extractor 222.

Referring to FIG. 7, the extractor 222 includes a subframe division unit 2221, a frequency converter 2222, a sub-band division unit 2223, a sub-band feature extractor 2224, and an identifier generator 2225.

The subframe division unit 2221 divides a plurality of samples of pre pre-processed sensor data into a plurality of subframes that are overlapped at a predetermined interval.

The frequency converter 2222 converts a plurality of subframes to a frequency signal.

The sub-band division unit 2223 divides a subframe that is converted to a frequency signal into a plurality of sub-bands.

The sub-band feature extractor 2224 extracts a characteristic pattern of each of divided sub-bands through an arithmetic operation such as an entropy difference value, and expresses characteristic pattern information of each sub-band with a bit of "0" or "1".

The identifier generator 2225 disposes bit information that is extracted from a plurality of sub-bands of a subframe in an N×M form according to a subframe order, and generates a feature vector identifier.

Figure 8:
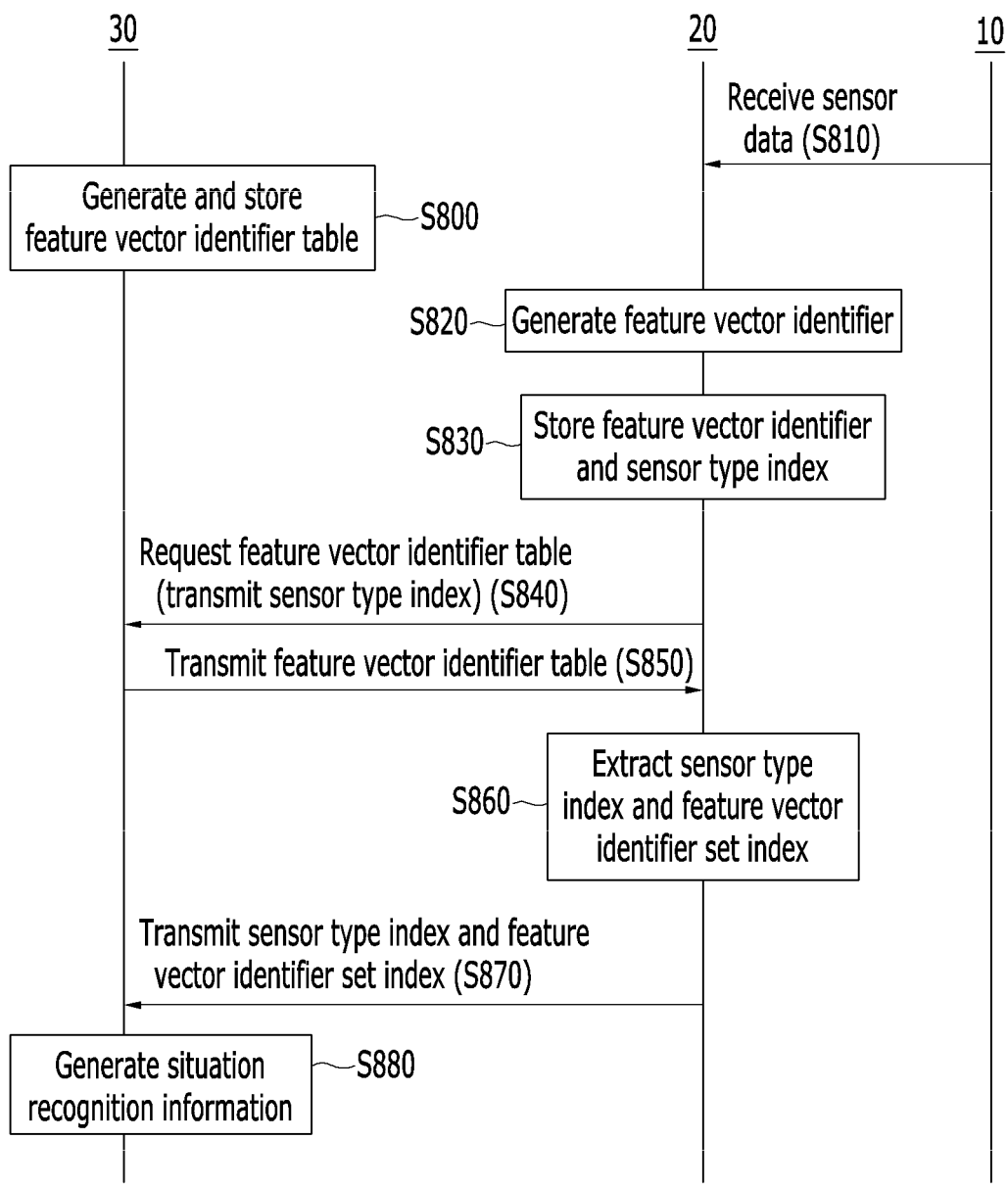
FIGS. 8 and 9 are flowcharts illustrating a method of processing sensor data according to first and second exemplary embodiments, respectively, of the present invention.

FIG. 8 is a flowchart illustrating a method of processing sensor data according to a first exemplary embodiment of the present invention, and illustrates a method of processing sensor data when the reference data processing controller 210 and the situation recognition unit 240 are formed in the sensor management server 30, and the sensor data processing controller 220 and the matching unit (230 of FIG. 2) are formed in the sensor gateway 20.

Referring to FIG. 8, when the sensor gateway 20 receives sensor data from the sensor 10 (S810), the sensor gateway 20 generates a feature vector identifier that is formed with fixed bit series from the received sensor data (S820).

The sensor gateway 20 stores the generated feature vector identifier together with a sensor type index (S830).

Next, as the sensor gateway 20 requests a feature vector identifier table corresponding to the sensor type index while transmitting the sensor type index to the sensor management server 30 (S840).

The sensor management server 30 generates a feature vector identifier of a plurality of situation information determination reference data to be a reference of situation determination, and generates and stores a feature vector identifier table using the feature vector identifier of the plurality of situation information determination reference data (S800).

When situation information determination reference data is received, the sensor management server 30 generates a feature vector identifier of situation information determination reference data and stores a feature vector identifier to correspond to a sensor type index and a feature vector identifier set index of the situation information determination reference data, thereby generating a feature vector identifier table.

The sensor management server 30 searches for a feature vector identifier table corresponding to a sensor type index that it receives from the sensor gateway 20 and transmits the found feature vector identifier table to the sensor gateway 20 (S850).

The sensor gateway 20 extracts a feature vector identifier set index and a sensor type index of a feature vector identifier of situation information determination reference data most similar to a feature vector identifier of sensor data through similarity comparison between feature vector identifiers within the found feature vector identifier table and a feature vector identifier of sensor data (S860).

The sensor gateway 20 transmits the extracted sensor type index and feature vector identifier set index to the sensor management server 30 (S870).

The sensor management server 30 generates situation recognition information using the sensor type index and the feature vector identifier set index (S880).

Figure 9:
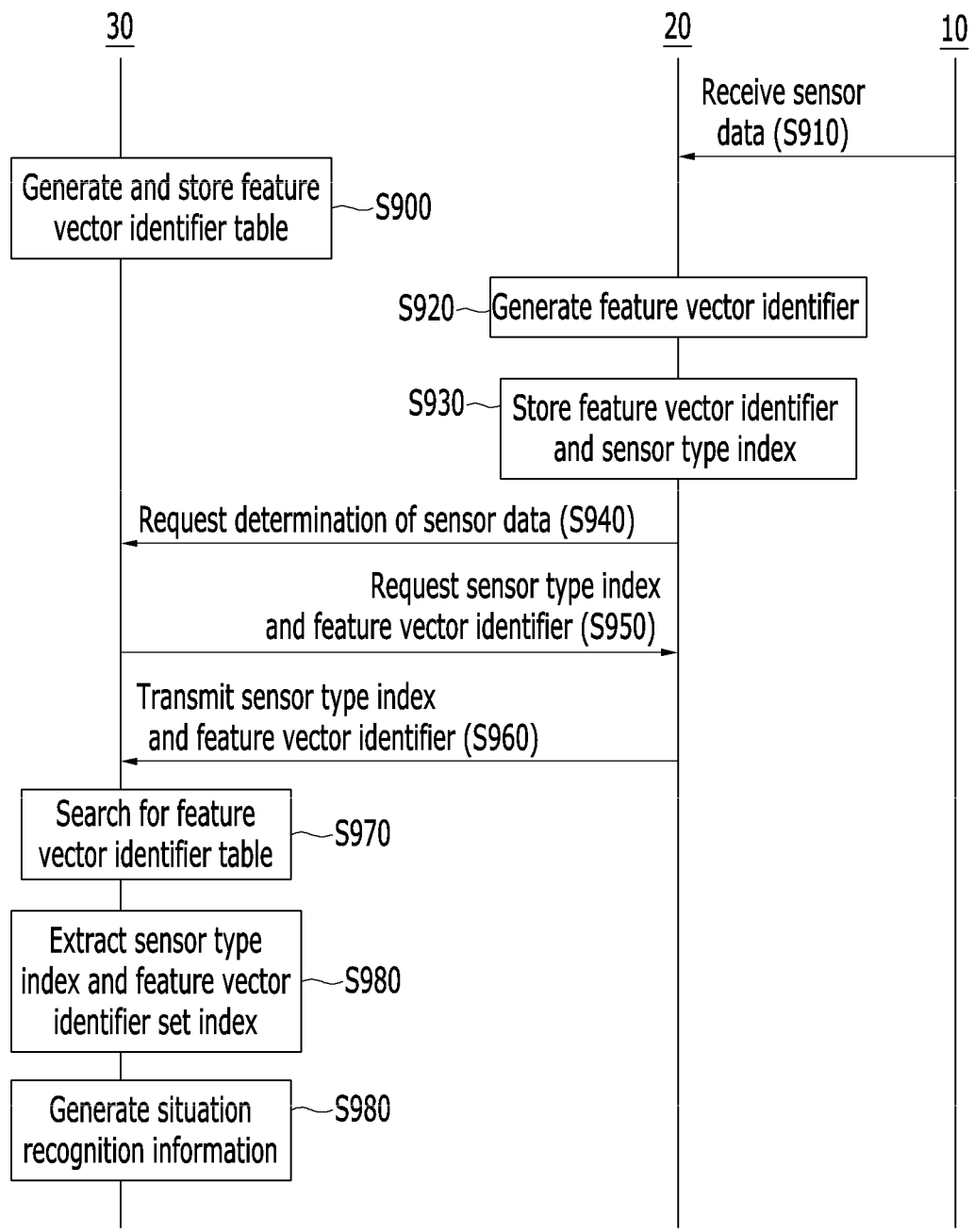

FIG. 9 is a flowchart illustrating a method of processing sensor data according to a second exemplary embodiment of the present invention, and illustrates a method of processing sensor data when the reference data processing controller 210, the matching unit (230 of FIG. 2), and the situation recognition unit 240 are formed in the sensor management server 30 and the sensor data processing controller 220 is formed in the sensor gateway 20. Referring to FIG. 9, when the sensor gateway 20 receives sensor data from the sensor 10, the sensor gateway 20 stores a feature vector identifier of sensor data together with a sensor type index with the same method as that described in FIG. 8 (S910-S930). Further, the sensor management server 30 generates and stores a feature vector identifier table with the same method as that described in FIG. 8 (S900).

Next, the sensor gateway 20 sends a request for determination of sensor data to the sensor management server 30 (S940).

The sensor management server 30 sends a request for a sensor type index and a feature vector identifier of sensor data to the sensor gateway 20 (S950), and the sensor gateway 20 transmits the sensor type index and the feature vector identifier of the sensor data to the sensor management server 30 (S960).

The sensor management server 30 searches for a feature vector identifier table corresponding to a sensor type index that it receives from the sensor gateway 20 (S970).

The sensor management server 30 extracts a sensor type index and a feature vector identifier set index of a feature vector identifier of situation information determination reference data most similar to a feature vector identifier of sensor data through similarity comparison between a feature vector identifier of the sensor data and feature vector identifiers within the found feature vector identifier table (S980).

The sensor management server 30 generates situation recognition information using the extracted sensor type index and feature vector identifier set index (S990).

According to the exemplary embodiment of the present invention, by summarizing a feature vector of dynamic dimensional sensor data and situation information determination reference data that are collected in real time from various sensors with a fixed bit series, a feature vector identifier is generated, and by comparing a feature vector identifier of sensor data and a feature vector identifier of situation information determination reference data, situation recognition information is determined and thus a calculation amount and a memory increase problem for existing machine learning can be solved.

Further, by forming situation information determination reference sensor data in a feature vector identifier table and by comparing situation recognition information, a clustering device or a classifier for machine learning is unnecessary and thus a system can be easily formed.

An exemplary embodiment of the present invention may not only be embodied through the above-described apparatus and/or method but may also be embodied through a program that executes a function corresponding to a configuration of the exemplary embodiment of the present invention or through a recording medium in which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of processing sensor data in a sensor data processing apparatus of a sensor network, the method comprising:
    generating a feature vector identifier table in which feature vector identifiers of a plurality of situation information determination reference data to be a reference of situation determination are stored;
    generating a feature vector identifier of sensor data that is received from a sensor; and
    generating situation recognition information of the sensor data using situation information determination reference data having a feature vector identifier most similar to the feature vector identifier of the sensor data with reference to the feature vector identifier table,
    wherein the feature vector identifier of the sensor data is generated as a fixed bit series of an N×M form of two dimensions through time series analysis or frequency analysis,
    wherein the feature vector of an form of two dimensions and the feature vector identifier table are generated according to the result of processing an large amount of sensor data,
    wherein the feature vector identifier table is generated by classifying each of the feature vector identifiers of a plurality of N×M form reference data according to a sensor type index and a feature vector identifier set index.

2. The method of claim 1, wherein the generating of a feature vector identifier comprises:
    extracting a feature vector of the sensor data; and
    expressing the feature vector of the sensor data with a bit series of an N×M form.

3. The method of claim 2, wherein the expressing of a feature vector comprises converting the feature vector of the sensor data to the bit series through time series analysis or frequency analysis.

4. The method of claim 1, wherein the generating of a feature vector identifier table comprises:

extracting each of feature vectors of the plurality of situation information determination reference data;

generating a feature vector identifier of the plurality of situation information determination reference data by expressing each of feature vectors of the plurality of situation information determination reference data with bit series; and generating the feature vector identifier table by classifying each of feature vector identifiers of the plurality of situation information determination reference data according to the sensor type index and the feature vector identifier set index of the plurality of situation information determination reference data, wherein the sensor type index is determined according to a sensor type, and the feature vector identifier set index is determined by a user according to situation information in the same sensor type index.

5. The method of claim 4, wherein the generating of a feature vector identifier of the plurality of situation information determination reference data comprises converting each of feature vectors of the plurality of situation information determination reference data to the bit series through time series analysis or frequency analysis.

6. The method of claim 4, wherein the generating of a feature vector identifier of a sensor data comprises:

extracting a feature vector of the sensor data;

generating a feature vector identifier of the sensor data by expressing the feature vector of the sensor data with a bit series; and storing the feature vector identifier of the sensor data to correspond to a sensor type index of the sensor data.

7. The method of claim 6, wherein the generating of situation recognition information comprises:

extracting a feature vector identifier set index and a sensor type index of a feature vector identifier of situation information determination reference data most similar to the feature vector identifier of the sensor data with reference to the feature vector identifier table; and generating the situation recognition information using the extracted sensor type index and feature vector identifier set index.

8. An apparatus that processes sensor data in a sensor network, the apparatus comprising one or more processors configured to embody a plurality of functional units including:

a sensor data processing controller that generates a feature vector identifier of a bit series from sensor data of a sensor;

a reference data processing controller that generates a feature vector identifier of a bit series from a plurality of situation information determination reference data to be a reference of situation determination and that generates a feature vector identifier table using the feature vector identifier of the plurality of situation information determination reference data;

a matching unit that compares the feature vector identifier of the feature vector identifier table and the feature vector identifier of the sensor data; and a situation recognition unit that generates situation recognition information of the sensor data using a feature vector identifier of situation information determination reference data most similar to the feature vector identifier of the sensor data, wherein the feature vector identifier of the sensor data is generated as a fixed bit series of an N×M form of two dimensions through time series analysis or frequency analysis, wherein the feature vector of an form of two dimensions and the feature vector identifier table are generated according to the result of processing an large amount of sensor data, wherein the reference data processing controller generates the feature vector identifier table by classifying each of the feature vector identifiers of a plurality of N×M form reference data according to a sensor type index and a feature vector identifier set index.

9. The apparatus of claim 8, wherein the sensor data processing controller analyzes a feature vector from the sensor data and converts the feature vector of the sensor data to a bit series of an N×M form, and the reference data processing controller analyzes feature vectors from each of the plurality of situation information determination reference data and converts feature vectors of each of the plurality of situation information determination reference data to a bit series of an N×M form.

10. The apparatus of claim 8, wherein the matching unit extracts a sensor type index and a feature vector identifier set index corresponding to a feature vector identifier of situation information determination reference data most similar to the feature vector identifier of the sensor data with reference the feature vector identifier table, and the situation recognition unit generates the situation recognition information using the extracted sensor type index and feature vector identifier set index.

11. The apparatus of claim 8, wherein the matching unit performs similarity comparison between the feature vector identifier of the feature vector identifier table and the feature vector identifier of the sensor data using a matching algorithm of a bit-error rate (BER).

12. The apparatus of claim 8, wherein the sensor network comprises a sensor gateway that receives sensor data from the sensor and that comprises the sensor data processing controller, and a sensor management server that provides situation recognition information of the sensor data to a user and that comprises the reference data processing controller and the situation recognition unit.

13. The apparatus of claim 12, wherein the matching unit is formed in the sensor gateway or the sensor management server.

* * * * *